United States Patent [19]
Hodgin

[11] Patent Number: 5,560,141
[45] Date of Patent: Oct. 1, 1996

[54] FISHING LURE ASSEMBLY

[75] Inventor: Doyle E. Hodgin, Durham, N.C.

[73] Assignee: Inspiration Lures, Inc., Apex, N.C.

[21] Appl. No.: 490,854

[22] Filed: Jun. 15, 1995

[51] Int. Cl.$^6$ .................................................. A01K 85/00
[52] U.S. Cl. ........................................ 43/42.15; 43/42.36
[58] Field of Search .............................. 43/42.15, 42.36, 43/42.49, 42.11, 42.45

[56] References Cited

U.S. PATENT DOCUMENTS

| | | | |
|---|---|---|---|
| 2,871,609 | 2/1959 | Noches | 43/42.49 |
| 3,003,276 | 10/1961 | Patterson | 43/42.15 |
| 3,740,891 | 6/1972 | Rubenstein | 43/42.15 |
| 3,877,168 | 4/1975 | Steven | 43/42.36 |
| 4,044,491 | 8/1977 | Potter | 43/42.49 |
| 4,437,257 | 3/1984 | Kluge | 43/42.45 |
| 4,453,334 | 6/1984 | Opperman | 43/42.49 |
| 5,379,543 | 1/1995 | Avent | 43/42.15 |
| 5,450,689 | 9/1995 | Glick | 43/42.45 |

*Primary Examiner*—Joseph J. Hail, III
*Assistant Examiner*—James Miner

[57] ABSTRACT

A fishing lure assembly is provided which includes a pair of floatable lures for attachment to a fishing rod line for casting. Each of the lures have a hook for impaling fish and the proximal or front lure is lighter in weight than the terminal or rear lure to maximize the casting ability of the user. The proximal lure includes an internal triangularly shaped wire web which provides structural integrity to the three eyelets thereon. Two of the eyelets are for line tying and the third eyelet allows convenient affixing of a hook. An intermediate flexible line allows the two lures to be spaced apart approximately 0.5 meters to increase the chances of two fish being simultaneously caught.

13 Claims, 2 Drawing Sheets

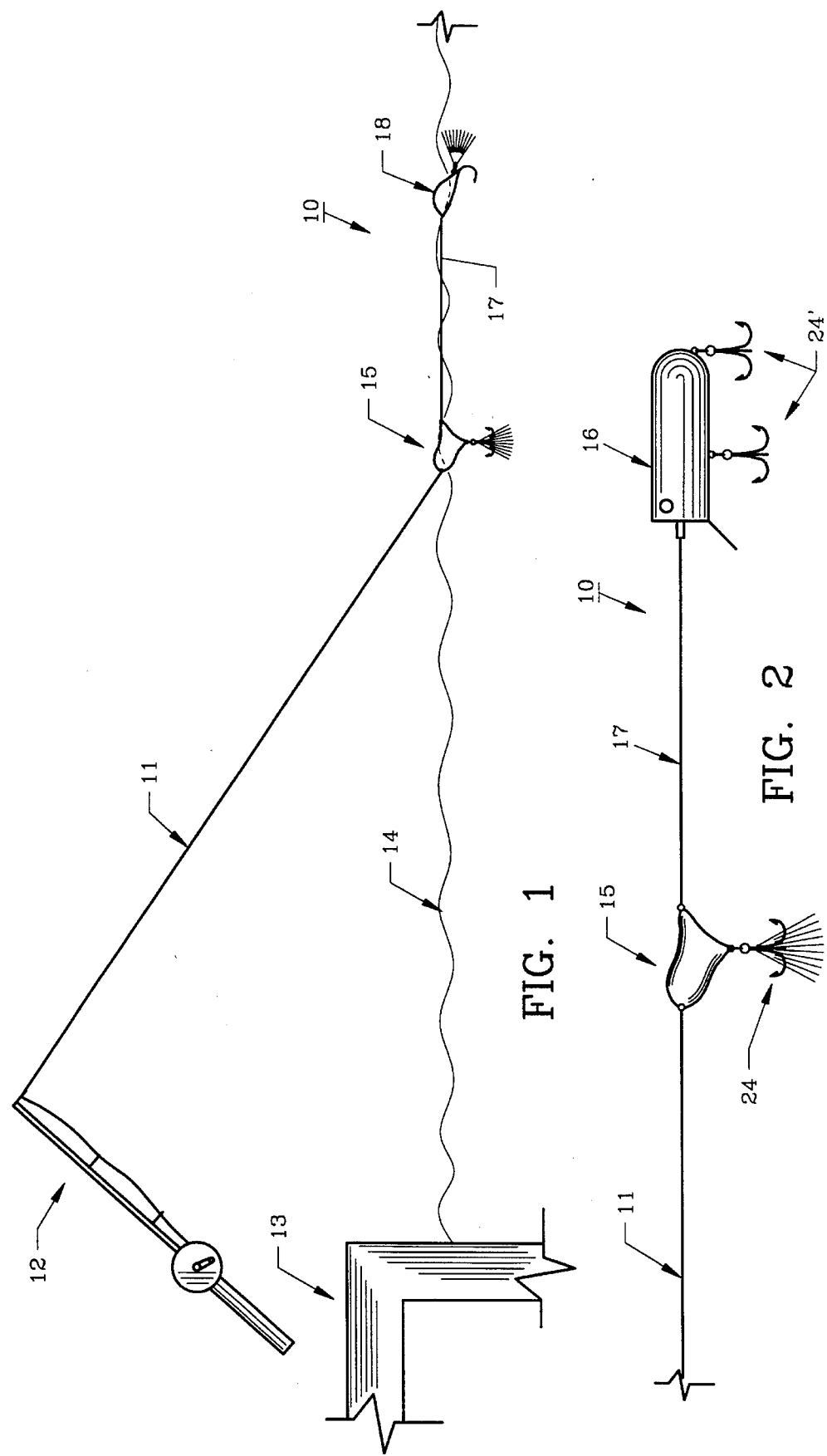

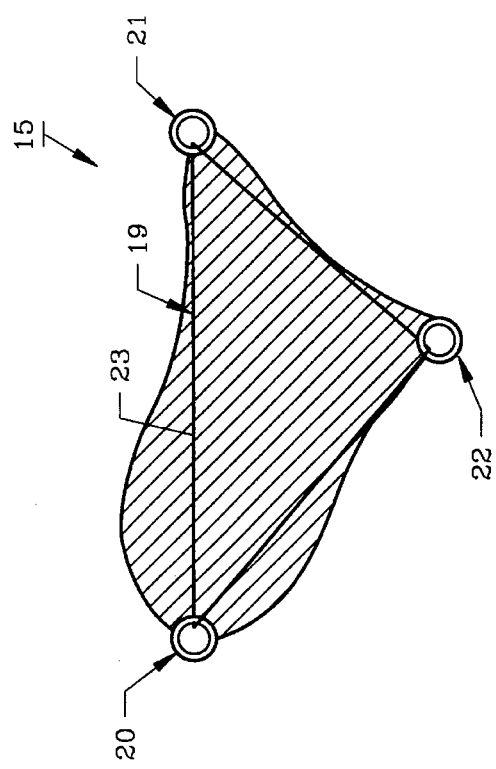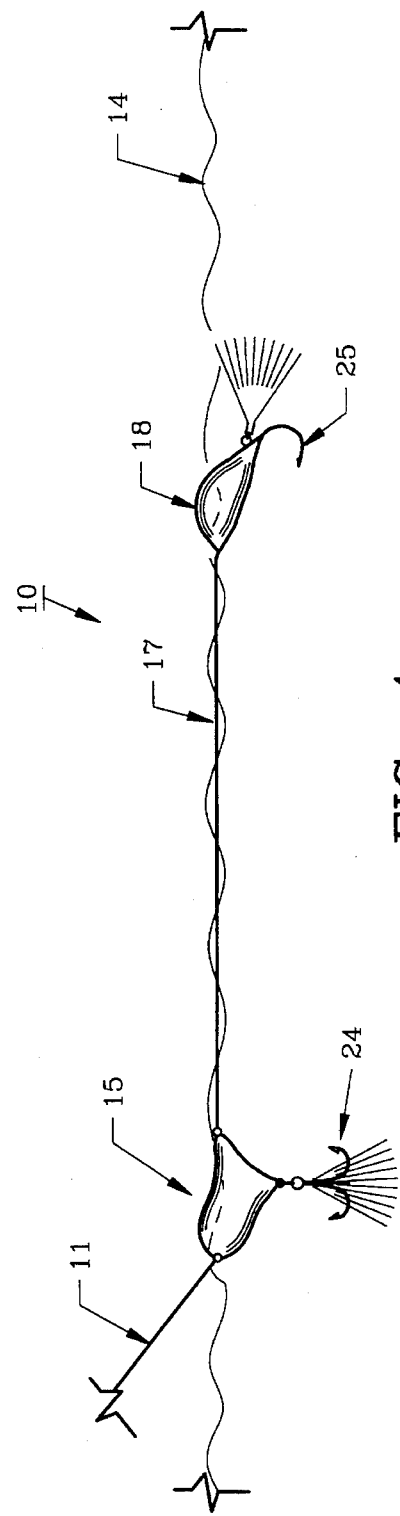

FISHING LURE ASSEMBLY

FIELD OF THE INVENTION

The invention herein pertains to fishing lures and particularly to floatable fishing lures used in casting as for example when fresh water fishing for bass and other game fish.

DESCRIPTION OF THE PRIOR ART AND OBJECTIVES OF THE INVENTION

Many types of fishing lures and lure assemblies have been used by fishermen over the years. Certain lure assemblies utilize a plurality of intermediate lines which are attached to a fishing line for casting and fishing purposes. It is also known in the art to utilize a weighted lure which can drag along the bottom of a lake or pond with one or more intermediate lines attached, said intermediate lines having lures with hooks. Various other lure assemblies utilize one or more hooks with either lures or bait affixed which attach to a fishing line. However, none of the prior art lure assemblies provide the advantages of the invention, such as in casting as will be more fully explained below. In addition, the preferred form of lure sets forth a durable lure which can undergo strong forces and stresses which are inherent in its use without damage. Thus, as will be further demonstrated, it is an objective of the present invention to provide a lure assembly which includes a pair of lures in linear alignment for convenience in casting.

It is another objective of the invention to provide a lure assembly having a first lure attached to a fishing line and which is also spaced along an intermediate line from a rear lure.

It is also an objective of the invention to provide a lure which includes an internal triangularly shaped web which provides strength and durability to the lure.

It is still another objective of the invention to provide a lure assembly in which the rear lure is heavier than the front lure for convenience in casting.

Various other objectives and advantages of the invention will become apparent to those skilled in the art as a more detailed description is set forth below.

SUMMARY OF THE INVENTION

A fishing lure assembly is provided having a front lure and a rear lure which are spaced apart along a flexible, intermediate line. The front lure is tied to a fishing line such as from a casting rod whereby the lure assembly can be cast and reeled in as usual. Both the front and rear lures are of the floatable type and include hooks whereby two fish can be caught simultaneously. The front lure is lighter in weight than the rear lure to provide assistance during casting and to prevent tangling of the lure assembly as the heavier terminal or rear lure maintains the intermediate line fully extended during casting. The front lure may also be formed with an internal web made of steel wire to improve its structural integrity and to prevent damage during periods of extreme stress such as may occur if two sizable fish are impaled simultaneously.

BRIEF DESCRIPTION OF THE DRAWINGS

FIG. 1 demonstrates the use of the lure assembly of the invention as when fishing from a pier;

FIG. 2 illustrates another lure assembly of the invention removed from the water;

FIG. 3 shows a cross section of the front lure as seen in FIGS. 1 and 2; and

FIG. 4 depicts an enlarged view of the lure assembly as shown in FIG. 1.

DESCRIPTION OF THE PREFERRED EMBODIMENTS

A fishing lure assembly is provided for attachment to a fishing line for use in casting. The fishing lure assembly includes a pair of linearly aligned floatable lures, each of which have hooks for impaling attracted fish. The first or front lure is joined to a second or terminal lure along a flexible intermediate line which allows the lures to be spaced apart a preferred distance of approximately 0.5 meters. The terminal lure preferably has a weight greater than the first lure to prevent the lures from tangling during casting.

The first lure is formed from a lightweight material to allow it to float and includes a trio of attaching members in the form of eyelets. Two of the eyelets are positioned along the longitudinal axis of the lure and the third eyelet is positioned about the bottom of the lure to form a somewhat triangular configuration. An internal web such as a wire triangle joins the eyelets and provides structural integrity thereto. The bottom eyelet provides a means for attaching a hook to the lure and due to its position prevents the hook from becoming entangled with the fishing or intermediate lines joined to the other two eyelets.

DETAILED DESCRIPTION OF THE INVENTION AND ITS METHOD OF OPERATION

For a better understanding of the invention, turning now to the drawings, FIG. 1 demonstrates fishing lure assembly 10 attached to fishing line 11 which in turn is affixed to casting rod 12 as would be held by a fisherman for example, standing on pier 13. As further shown in FIG. 1, fishing lure assembly 10 is resting in water 14 which may be a freshwater pond, lake, stream or the like. Fishing lure assembly 10, as shown in another embodiment in FIG. 2, consists of a first or front lure 15 and a second or terminal lure 16 joined by flexible, intermediate line 17. Line 17 may be identical size and weight to fishing line 11 or may be different. Lures 15 and 16 as seen in FIG. 2 are different and as explained earlier, lure 16 while being floatable as is front lure 15 has a greater weight to assist in casting and to prevent entanglement thereof. As further shown in FIG. 2, both front lure 15 and rear lure 16 have hooks affixed thereto whereby fish can be caught simultaneously on both lures.

The method of forming fishing lure assembly 10 consists of attaching first floatable lure 15 having a hook, to intermediate line 17 and to fishing line 11. To the opposite end of intermediate line 17 a second or rear floatable lure, such as lure 18 with a hook as seen in FIG. 1, is attached which is heavier than first lure 15 whereby fish can be caught on each lure simultaneously.

In FIG. 3, lure 15 is presented in a cross-sectional view to illustrate internal web 19. Eyelets 20 and 21 are positioned along the longitudinal axis of lure 15 whereas eyelet 22 is somewhat below the longitudinal axis. As further seen, web 19 is triangularly shaped with longer side 23 substantially horizontal and above eyelet 22. Web 19 is formed from a steel wire and provides structural integrity in the event large forces are applied to web 19 during casting, reeling in, or when attacked by a large fish that may jerk eyelet 22 through a hook therefrom such as trio of hooks 24 seen in FIG. 4. As would be understood from FIG. 3, hook 24 which is suspended below the longitudinal axis of lure 15 assists in preventing entanglement with intermediate line 17 or fishing line 11 such as during casting as it is spaced sufficiently therefrom.

In FIG. 4, terminal lure 18 has a shape different from terminal lure 16 as shown in FIG. 2. However, both lures 18 and 16 have a weight greater than lure 15 to assist in casting. Intermediate line 17 allows lure 18 to be spaced a convenient distance from lure 15. While this distance can be varied, approximately 0.5 meters has been found to allow ease in casting, and reeling in, and allows fish to simultaneously attack both lures 15 and 18 without interference.

The examples and illustrations above set forth are merely for explanatory purposes and the dimensions and embodiments described are not intended to limit the appended claims with equivalents being anticipated by those skilled in the art practicing the teachings presented.

I claim:

1. A fishing lure assembly for attachment to a fishing line comprising: a first floatable lure, a second floatable lure, an intermediate line, said first and said second lures spaced along said intermediate line, said first lure comprising an internal web, a plurality of eyelets, said eyelets joined to said internal web, whereby said lure assembly can be attached to a fishing line for casting.

2. The fishing lure assembly of claim 1 wherein said first lure is lighter in weight than said second lure.

3. The fishing lure assembly of claim 1 wherein said first and said second lures are spaced about 0.5 meters apart along said intermediate line.

4. The fishing lure assembly of claim 1, further comprising a pair of hooks, each of said first and said second lures having one of said hooks attached to one of said eyelets.

5. A fishing lure assembly for attachment to a fishing line for casting, comprising: a first floatable lure, a second floatable lure, said second lure having a weight greater than said first lure, an intermediate line, said first and said second lures spaced along said intermediate line, said first lure comprising an internal web, said internal web having a generally triangular shape, three eyelets, each of said eyelets joined to said internal web, one of said eyelets for attachment to said fishing line, one of said eyelets for attachment to said intermediate line.

6. A floatable fishing lure assembly comprising: a first floatable lure, said first floatable lure comprising a body portion, an internal web, said internal web located inside said body portion, and three eyelets, each of said eyelets attached to said internal web, an intermediate line, said intermediate line connected to said first floatable lure, and a Second floatable lure, said second floatable lure joined to said intermediate line.

7. The floatable fishing lure assembly of claim 6 wherein said internal web is formed from wire.

8. The floatable fishing lure assembly of claim 6 wherein said internal web is triangular in shape.

9. The floatable fishing lure assembly of claim 8 wherein one side of said triangular web is longer than the other two sides.

10. The floatable fishing lure assembly of claim 9 wherein said longer side of said triangular web extends along the longitudinal axis of said body portion.

11. A method of forming a fishing lure assembly comprising the steps of:

(a) attaching a first floatable lure having three eyelets attached to an internal Web inside the lure body to one end of an intermediate line, and (b) attaching a second floatable lure having a weight no less than said first floatable lure to the other end of said intermediate line.

12. The method of claim 11 and including the step of attaching said first floatable lure to a fishing line for casting.

13. The method of claim 11 wherein the step of attaching said second lure comprises attaching said second lure approximately 0.5 meters behind said first lure along said intermediate line.

* * * * *